(12) United States Patent
Kurz et al.

(10) Patent No.: US 9,682,690 B2
(45) Date of Patent: Jun. 20, 2017

(54) METHOD FOR ACTUATING A HYDRAULIC BRAKING SYSTEM

(71) Applicant: Robert Bosch GmbH, Stuttgart (DE)

(72) Inventors: Florian Kurz, Heilbronn (DE); Thomas Schmidt, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/686,985

(22) Filed: Apr. 15, 2015

(65) Prior Publication Data

US 2015/0298667 A1    Oct. 22, 2015

(30) Foreign Application Priority Data

Apr. 22, 2014   (DE) .................. 10 2014 207 525

(51) Int. Cl.
| | |
|---|---|
| *B60T 8/176* | (2006.01) |
| *B60T 13/66* | (2006.01) |
| *B60T 7/04* | (2006.01) |
| *B60T 13/14* | (2006.01) |
| *B60T 13/68* | (2006.01) |
| *B60T 8/40* | (2006.01) |
| *B60T 8/42* | (2006.01) |

(52) U.S. Cl.
CPC ............ *B60T 13/662* (2013.01); *B60T 7/042* (2013.01); *B60T 8/4059* (2013.01); *B60T 8/4275* (2013.01); *B60T 13/146* (2013.01); *B60T 13/686* (2013.01)

(58) Field of Classification Search
CPC ...... B60T 8/404; B60T 8/4059; B60T 8/4275; B60T 13/14; B60T 13/66; B60T 13/662; B60T 13/686; B60T 17/06
USPC .......................... 303/3, 11, 15, 115.4, 116.1
See application file for complete search history.

(56) References Cited

U.S. PATENT DOCUMENTS

| | | | | |
|---|---|---|---|---|
| 5,388,894 A | * | 2/1995 | Holland | .................. B60T 8/404 200/82 D |
| 5,971,502 A | * | 10/1999 | Albert | .................... B60T 8/175 188/358 |
| 2004/0135429 A1 | * | 7/2004 | Yang | .................. F16K 31/0693 303/119.2 |

* cited by examiner

*Primary Examiner* — Thomas J Williams
*Assistant Examiner* — Mariano Sy
(74) *Attorney, Agent, or Firm* — Gerard Messina

(57) ABSTRACT

In a method for actuating a hydraulic braking system, a hydraulic fluid is temporarily stored in a storage chamber when the antilocking system is activated. An additional hydraulic buffer volume of the storage chamber increases as the vehicle speed decreases.

27 Claims, 2 Drawing Sheets

METHOD FOR ACTUATING A HYDRAULIC BRAKING SYSTEM

BACKGROUND OF THE INVENTION

1. Field of the Invention

The present invention relates to a method for actuating a hydraulic braking system having an antilocking system in a vehicle.

2. Description of the Related Art

Hydraulic braking systems having integrated antilocking systems for preventing a wheel locking in the event of heavy brake actuation are known. The braking systems include one or multiple wheel brake units in one brake circuit, which are hydraulically actuatable, the hydraulic fluid to the wheel brake units being controlled via inlet and outlet valves. The antilocking system includes an electrically drivable recirculation pump and a storage chamber integrated into the brake circuit for receiving hydraulic fluid, which, in the event of an imminent wheel locking, flows from the wheel brake units into the storage chamber via the opened outlet valves. When activating the recirculation pump, the hydraulic fluid is conveyed out of the storage chamber back into the brake circuit. The activation of the recirculation pump is linked to a noise emission.

BRIEF SUMMARY OF THE INVENTION

The object of the present invention is to reduce the noise emission in a hydraulic braking system, which is equipped with an antilocking system, using simple measures.

The method according to the present invention may be used in hydraulic braking systems, which are equipped with an antilocking system for preventing a wheel locking. The pressure of the hydraulic fluid in wheel brake units at the wheels is controlled via the antilocking system in such a way that in the event of an imminent locking or for adjusting the optimum brake slip via a modulation of the pressure build-up or pressure drop, outlet valves are opened to allow hydraulic fluid to flow out of the wheel brake units and to reduce the wheel brake pressure. The outflowing hydraulic fluid is retained in a storage chamber, which is situated in a brake circuit of the braking system, and from which the fluid is conveyed back into the brake circuit through activation of a recirculation pump; the recirculation pump and the storage chamber also form part of the antilocking system. If the wheel brake pressure again drops below a critical value, the outlet valve may be closed and, at the same time, an inlet valve may be opened, so that hydraulic fluid again flows into the wheel brake units and the wheel brake pressure is again restored.

The activation of the recirculation pump, which is connected to an electric pump motor, is linked to a noise emission. In the method according to the present invention, the noise emission is kept to a minimum by establishing an allowable, additional hydraulic buffer volume as a function of speed, which is not taken into consideration in the storage chamber when it is emptied by the recirculation pump. The maximum allowable hydraulic volume, which may effectively be used, and which reaches the maximum overall physical volume of the storage chamber, is composed of a working volume, which is conveyed into or out of the storage chamber during activation of the antilocking system, and a buffer volume, which, in the function according to the present invention, increases as the speed of the vehicle decreases. Thus, the effective maximum hydraulic volume of the storage chamber is reduced by the size of the additional hydraulic buffer volume. This additional buffer volume increases as the vehicle speed decreases, so that at higher speeds, the allowable, additional buffer volume is smaller than at lower speeds.

The recirculation pump is activated in such a way that, ultimately, the fluid volume accruing as a result of the ABS regulation is conveyed from the storage chamber up to the absolute size of the additional hydraulic buffer volume. Since a higher additional hydraulic buffer volume is allowable at lower speeds, a lower conveyance by the recirculation pump is sufficient for emptying the storage chamber, allowing the recirculation pump to be operated at a lower target speed, which is accompanied by a reduction of the noise emission. In particular, it is possible for the target pump speed of the recirculation pump to be held constant within a defined speed range, preferably below a speed limiting value, so that a noise emission resulting from increasing and decreasing target speeds of the recirculation pump is eliminated. On the whole, it is possible as a result to significantly reduce the noise level at low speeds.

According to one advantageous embodiment, the allowable hydraulic buffer volume increases only below a speed limiting value as the speed of the vehicle decreases. At higher speeds, the pump noise of the recirculation pump is overlain by vehicle noises and wind noises, so that the noise emission by the recirculation pump at higher speeds is less of a factor. The speed limiting value is, for example, a maximum of 10 km/h, for example, 5 km/h, 6 km/h or 7 km/h. If the vehicle is decelerated from a higher speed and falls below the speed limiting value, then, in the method according to the present invention, the maximum allowable hydraulic volume in the storage chamber is increased to the volume to which the storage chamber may be filled with hydraulic fluid. The increase in this case may be linear and may be capped at an upper limiting value, which is reached, in particular, when a second, lower speed limiting value is undercut. The second, lower speed limiting value is, for example, half as large as the first, higher speed limiting value, upon the undercutting of which the maximum allowable hydraulic volume of the storage chamber begins to increase.

According to another advantageous embodiment, the additional hydraulic buffer volume increases as the speed of the vehicle decreases, only if the friction coefficient between the wheel and the roadway is below a friction limiting value, which is maximal 0.2 or maximal 0.1, for example. This ensures that during a regulation of the antilocking system, no sudden drop in braking pressure in the wheel brake units of the braking system caused by a sudden change in the friction coefficient may occur, which may result in a complete filling of the storage chamber and, therefore, to a locking of the wheels, but rather, even when the antilocking system is already being actively regulated, a medium filling level is set in the storage chamber, which still permits an increase according to the present invention to the additional hydraulic buffer volume.

Conversely, no increase in the additional hydraulic buffer volume takes place in the storage chamber if the friction coefficient is above the friction coefficient limiting value. In this case, a sufficiently large, free volume must be maintained in the storage chamber which, in the event of an occurring regulation by the antilocking system, is used for receiving the hydraulic fluid flowing from the wheel brake units during a drop in braking pressure, and for maintaining a reserve range for a potential jump in the friction coefficient due to large wheel target pressure differences and the resulting high, accumulating fluid volume to be reduced.

It is advantageous if the sum of the working volume and the buffer volume does not exceed a maximum volume, the working volume advantageously being at most as large as the buffer volume. This ensures that the maximum allowable hydraulic volume, as the sum of the working volume and the buffer volume, may not become larger than the storage volume in the storage chamber, so that even when the additional hydraulic buffer volume is fully utilized, there is no risk of the locking of the wheels occurring.

According to another advantageous embodiment, the pump speed in the case of an increased additional hydraulic buffer volume is, at least in sections, nearly constant or lower. This pertains, in particular, to the section with a cap on a constant value below the second, lower speed limiting value. A constant pump speed at low speeds is felt subjectively as more pleasant than a pump speed which is continuously increasing and decreasing.

According to another advantageous embodiment, the increase in the additional hydraulic buffer volume takes place only when the vehicle is continuously decelerated, in particular, at a minimum deceleration value. This criterion may also be used for neutralizing the increase in the additional hydraulic buffer volume by partially or fully neutralizing the increase if the vehicle is not continuously decelerated, in particular at the minimum deceleration value. Alternatively or in addition, the increase in the additional hydraulic buffer volume may also be neutralized after the lapse of a defined period of time.

The method for increasing the additional hydraulic buffer volume is carried out in a hydraulic braking device in a vehicle. The different method steps are implemented via signals of a regulating or control device installed in the vehicle, and via which the various adjustable components of the braking system are controlled, in particular the inlet valves and the outlet valves, as well as the recirculation pump.

DETAILED DESCRIPTION OF THE INVENTION

Figure 1:
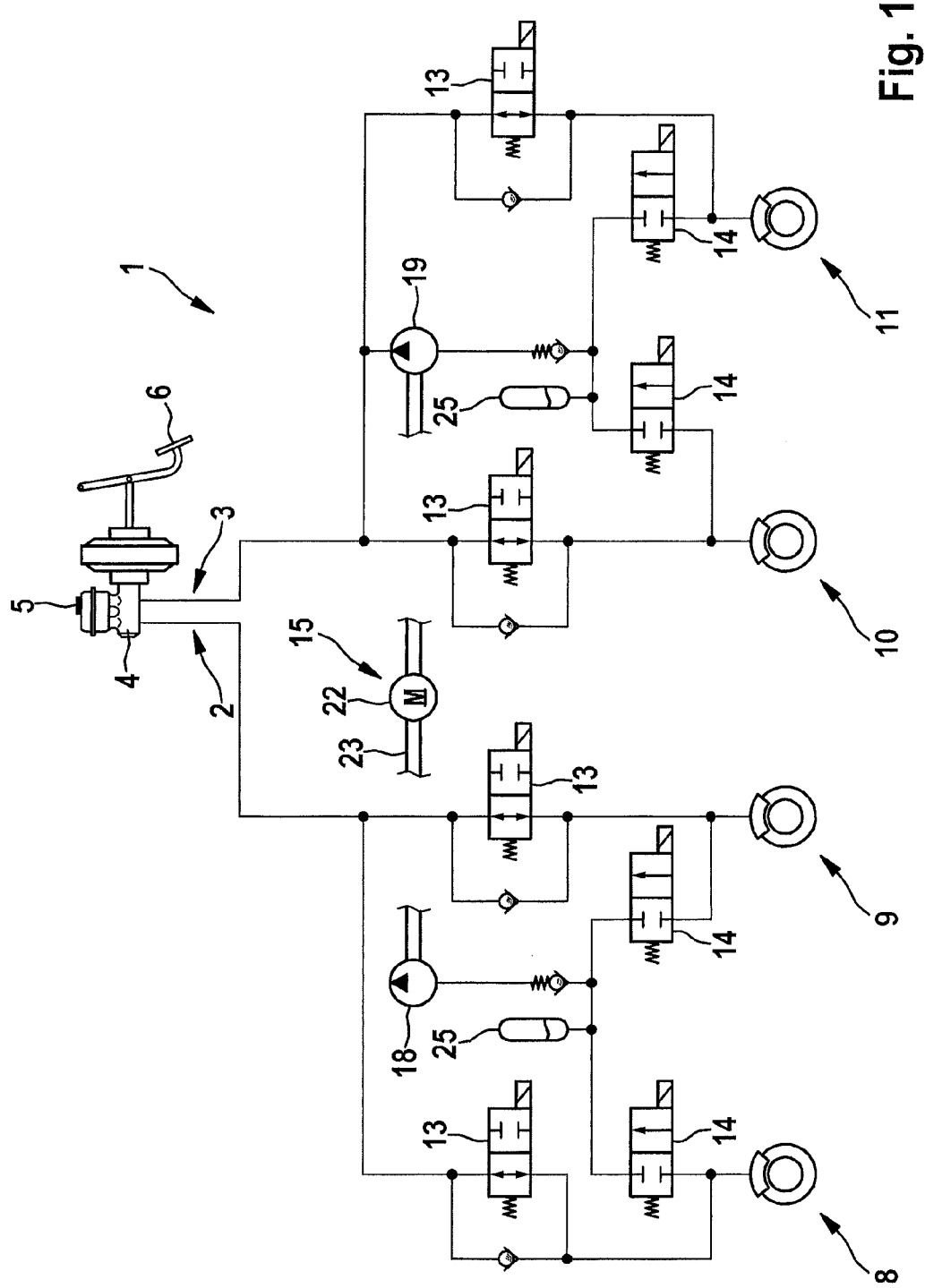
FIG. 1 shows a hydraulic circuit diagram of a vehicle braking system having two brake circuits and an integrated antilocking system.

The hydraulic brake configuration in a braking system 1 depicted in the hydraulic circuit diagram according to FIG. 1 includes a first brake circuit 2 and a second brake circuit 3 for supplying in each case two wheel brake units 8, 9, 10, 11 with hydraulic brake fluid. The distribution of the brake circuits is split diagonally, for example, so that per brake circuit 2, 3, one wheel brake unit is provided on one front wheel and on one rear wheel.

The two brake circuits 2, 3 are connected to a shared main brake cylinder 4, which is supplied with brake fluid via a brake fluid reservoir 5. Main brake cylinder 4 is actuated by the driver via brake pedal 6; the pedal travel applied by the driver may be measured via a pedal travel sensor.

Situated in each brake circuit 2, 3 are inlet valves 13, which are currentless open and with which check valves are associated, through which fluid may flow from the wheel brake units in the direction toward the main brake cylinder.

Each wheel brake unit 8, 9, 10, 11 is associated with an outlet valve 14, which is currentless closed. Each of the outlet valves 14 is linked to the intake side of a pump unit 15, which includes a recirculation pump 18 and 19 in each brake circuit 2, 3. Pump unit 15 is associated with an electric pump motor 22, which activates both recirculation pumps 18 and 19 via a shaft 23. The pressure side of recirculation pumps 18 and 19 empties into the respective brake circuit on the side facing toward the main brake cylinder. Pump unit 15, together with the two recirculation pumps 18 and 19, electric pump motor 22 and shaft 23 are part of an antilocking system for preventing wheel locking, and may also be activated in conjunction with an electronic stability program (ESP).

Situated between outlet valves 14 and the intake side of recirculation pump 18 and 19 is one storage chamber 25 per brake circuit 2, 3, which is used for temporary storage of hydraulic fluid, which is released from wheel brake units 8, 9, 10, 11 through outlet valves 14 during a driving-dynamic intervention. Storage chambers 25 are also part of the antilocking system.

Pressure sensors may be situated in the brake circuits for pressure measurement.

When the antilocking system is activated, the inlet valves and outlet valves are alternately opened and closed in rapid succession to prevent a wheel from locking. If it is determined that the risk of a wheel locking is imminent, for example, by evaluating measured data of the wheel speed sensors, the regulation is then activated by the antilocking system, inlet valve 13 being closed and outlet valve 14 being opened in order to reduce the wheel brake pressure. Hydraulic fluid may then flow out of the wheel brake unit; the hydraulic fluid is retained in storage chamber 25. Once the wheel brake pressure is reduced, outlet valve 14 is closed again and inlet valve 13 is opened, whereupon the wheel brake pressure is again restored. This process is repeated at a defined control frequency when the antilocking system is actively regulated.

Figure 2:
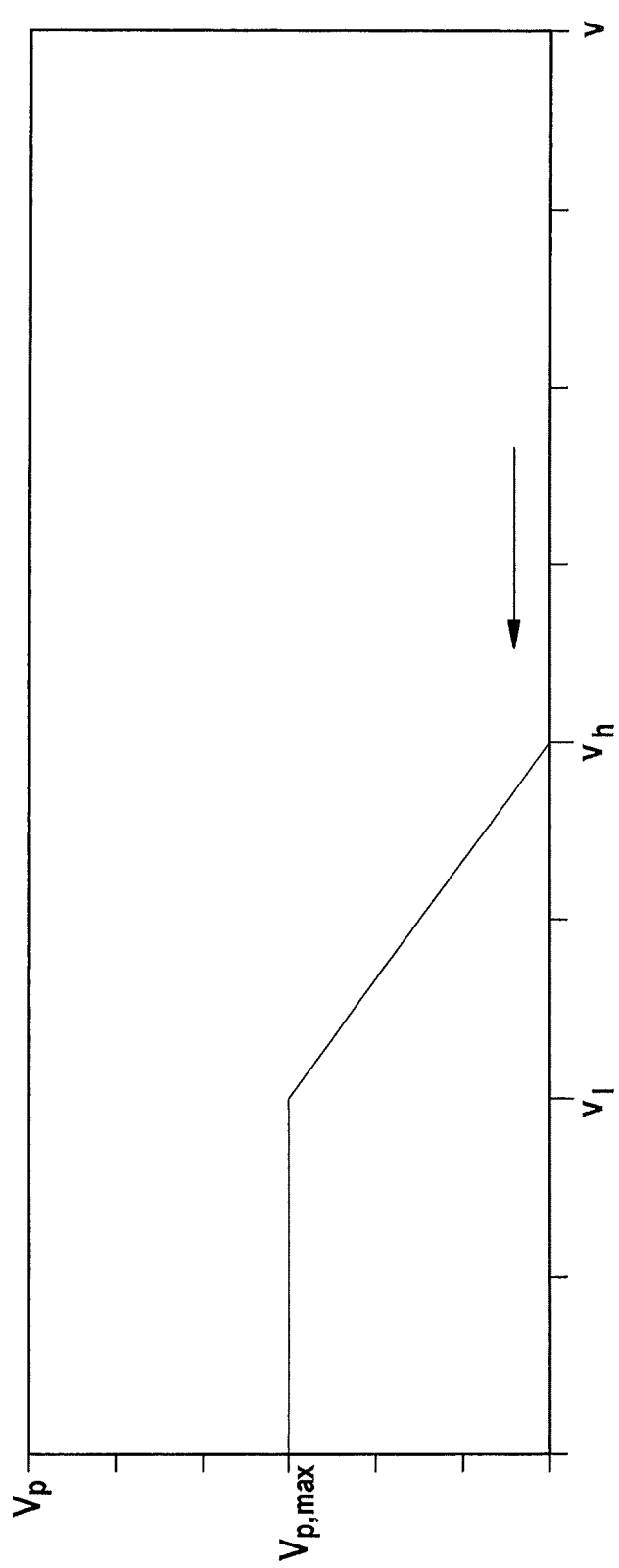
FIG. 2 shows a diagram with the curve of a buffer volume in a storage chamber as a function of the vehicle speed.

FIG. 2 shows a buffer volume $V_p$ as a function of vehicle speed v. Buffer volume $V_p$ relates to the volume of the storage chamber and is part of the maximum allowable hydraulic volume, which may be retained in the storage chamber, and which is below the holding capacity of the storage chamber. Buffer volume $V_p$ is added together with a working volume to yield the maximum allowable hydraulic volume in the storage chamber, the working volume being conveyed into or out of the storage chamber when the antilocking system in the braking system is activated. Thus, the buffer volume expands the maximum allowable hydraulic volume in the storage chamber to the volume to which the storage chamber may be maximally filled with hydraulic fluid in the brake circuit. The physical overall storage chamber volume in this case does not change; the working volume becomes smaller during regulation of the antilocking system under defined boundary conditions.

A prerequisite for the increase is that the vehicle is decelerated and, thus, as plotted with the arrow in FIG. 2, vehicle speed v is reduced. If a first speed limiting value $v_h$ is undercut, a linear increase in buffer volume $V_p$ begins up to a maximum buffer volume $V_{p,max}$, which is reached when a second, lower speed limiting value $V_l$ is undercut. The first, higher speed limiting value $V_h$ is 2 m/s, for example; the lower speed limiting value $V_l$ is 1 m/s, for example.

The working volume, with which the storage chamber is filled with hydraulic fluid when the antilocking system is activated, and the buffer volume with the maximum buffer volume $V_{p,max}$, are in a defined relationship relative to one another, in which the working volume is at most as large as the maximum buffer volume. In addition, the sum of the working volume and the buffer volume may not exceed a maximum volume, which is advantageously smaller than the maximum storage capacity in the storage chamber.

The use of an additional buffer volume $V_p$ permits a reduction in the pump speed of the recirculation pump, with which the storage chamber is again emptied. A constant pump speed is advantageously used, at least at speeds less than lower speed limiting value $V_l$, so that, together with the lowering of the pump speed, a significantly lower noise emission is achieved.

The use of additional buffer volume $V_p$ is preferably carried out only if the vehicle is slowed down with a defined deceleration. The deceleration must be steady or continuous. A deceleration limiting value may, if necessary, be predefined, which must be exceeded by the vehicle in order for buffer volume $V_p$ to increase.

The deceleration may also be used for aborting or neutralizing the increase in buffer volume $V_p$. Once the vehicle no longer decelerates or the deceleration drops below the deceleration limiting value, buffer volume $V_p$ is either reduced or completely eliminated, so that the maximum allowable hydraulic volume is limited to the working volume. Moreover, it is also advantageous for the buffer volume to be neutralized after the lapse of a defined period of time.

Another prerequisite for increasing the buffer volume requires the condition to be met that the friction coefficient between the wheel and the roadway does not exceed a friction coefficient limiting value, which involves a comparatively small value of, for example, 0.1 or 0.2. This ensures that an additional lowering of the friction coefficient does not result, or at least not significantly, in a significant lowering of the wheel brake pressure and, concomitantly, in a significant increase in the degree of filling in the storage chamber.

What is claimed is:

1. A method for actuating a hydraulic braking system having an antilocking system in a vehicle, the method comprising:
   storing hydraulic fluid of a brake circuit in a storage chamber when the antilocking system is activated; and
   subsequently recirculating a working volume of the hydraulic fluid from the storage chamber into the brake circuit with the aid of a recirculation pump, while leaving a buffer volume of the hydraulic fluid to remain in the storage chamber after the working volume is conveyed out of the storage chamber,
   wherein a size of the buffer volume relative to a storage capacity of the storage chamber increases as a speed of the vehicle decreases.

2. The method as recited in claim 1, wherein the buffer volume increases conditional upon the speed of the vehicle being below a first speed limiting value.

3. The method as recited in claim 2, wherein the speed limiting value is a maximum of 10 km/h.

4. The method as recited in claim 2, wherein the buffer volume remains constant conditional upon the speed of the vehicle decreasing below a second speed limiting value which is lower than the first speed limiting value.

5. The method as recited in claim 1, wherein the buffer volume increases as the vehicle speed decreases conditional upon a friction coefficient between at least one wheel of the vehicle and a roadway being below a specified friction coefficient limiting value.

6. The method as recited in claim 5, wherein the friction coefficient limiting value is a maximum of 0.2.

7. The method as recited in claim 1, wherein a pump speed of the recirculation pump is at least one of: substantially constant when the buffer volume is increased, or decreased when the buffer volume is increased.

8. The method as recited in claim 1, wherein the working volume is at most as large as the buffer volume.

9. The method as recited in claim 1, wherein the increase of the buffer volume is reduced or neutralized if the vehicle is not continuously decelerated.

10. The method as recited in claim 1, wherein the increase of the buffer volume is neutralized after lapse of a defined period of time.

11. The method as recited in claim 1, wherein the increase of the buffer volume occurs conditional upon the vehicle being continuously decelerated.

12. The method as recited in claim 1, wherein the working volume decreases as the buffer volume increases.

13. A system for controlling a hydraulic braking system having an antilocking system in a vehicle, the system comprising:
    a control unit including a processor configured to control the following:
      storing hydraulic fluid of a brake circuit in a storage chamber when the antilocking system is activated; and
      subsequently recirculating a working volume of the hydraulic fluid from the storage chamber into the brake circuit with the aid of a recirculation pump, while leaving a buffer volume of the hydraulic fluid to remain in the storage chamber after the working volume is conveyed out of the storage chamber,
      wherein a size of the buffer volume relative to a storage capacity of the storage chamber increases as a speed of the vehicle decreases.

14. The system as recited in claim 13, wherein the buffer volume increases conditional upon a speed of the vehicle being below a first speed limiting value.

15. The system as recited in claim 14, wherein the buffer volume remains constant conditional upon the speed of the vehicle decreasing below a second speed limiting value which is lower than the first speed limiting value.

16. The system as recited in claim 13, wherein the buffer volume increases as the vehicle speed decreases conditional upon a friction coefficient between at least one wheel of the vehicle and a roadway being below a specified friction coefficient limiting value.

17. The system as recited in claim 13, wherein a pump speed of the recirculation pump is at least one of: substantially constant when the buffer volume is increased, or decreased when the buffer volume is increased.

18. The system as recited in claim 13, wherein the working volume is at most as large as the buffer volume.

19. The system as recited in claim 13, wherein the increase of the buffer volume is reduced or neutralized if the vehicle is not continuously decelerated.

20. The system as recited in claim 13, wherein the increase of the buffer volume occurs conditional upon the vehicle being continuously decelerated.

21. The system as recited in claim 13, wherein the increase of the buffer volume is neutralized after lapse of a defined period of time.

22. The system as recited in claim 13, wherein the working volume decreases as the buffer volume increases.

23. A system for actuating a hydraulic braking system having an antilocking system in a vehicle, the system comprising:
    means for storing hydraulic fluid of a brake circuit in a storage chamber when the antilocking system is activated; and means for subsequently recirculating a working volume of the hydraulic fluid from the storage chamber into the brake circuit with the aid of a recirculation pump, while leaving a buffer volume of the hydraulic fluid to remain in the storage chamber after the working volume is conveyed out of the storage chamber, wherein a size of the buffer volume relative to a storage capacity of the storage chamber increases as a speed of the vehicle decreases.

24. The system as recited in claim 23, wherein the buffer volume increases conditional upon a speed of the vehicle being below a first speed limiting value.

25. The system as recited in claim 24, wherein the buffer volume remains constant conditional upon the speed of the vehicle decreasing below a second speed limiting value which is lower than the first speed limiting value.

26. The system as recited in claim 23, wherein the increase of the buffer volume occurs conditional upon the vehicle being continuously decelerated.

27. The system as recited in claim 23, wherein the working volume decreases as the buffer volume increases.

* * * * *